United States Patent
Haglid

(10) Patent No.: US 8,162,042 B2
(45) Date of Patent: Apr. 24, 2012

(54) ENERGY RECOVERY VENTILATOR WITH CONDENSATE FEEDBACK

(75) Inventor: Klas C. Haglid, Ridgewood, NJ (US)

(73) Assignee: Building Performance Equipment, Inc., Hillsdale, NJ (US)

( * ) Notice: Subject to any disclaimer, the term of this patent is extended or adjusted under 35 U.S.C. 154(b) by 1133 days.

(21) Appl. No.: 11/656,110

(22) Filed: Jan. 22, 2007

(65) Prior Publication Data
US 2008/0173433 A1 Jul. 24, 2008

(51) Int. Cl.
- F28F 3/00 (2006.01)
- F28D 7/02 (2006.01)
- F25D 21/00 (2006.01)
- F25D 21/14 (2006.01)

(52) U.S. Cl. ............. 165/165; 165/166; 62/272; 62/285

(58) Field of Classification Search .................. 165/111, 165/165, 167, 166; 62/248, 272, 279, 285, 62/288, 291; 454/85, 93, 198, 121; 202/202, 202/203, 204
See application file for complete search history.

(56) References Cited

U.S. PATENT DOCUMENTS

| | | | |
|---|---|---|---|
| 1,662,870 A | 3/1928 | Stancliffe | |
| 2,247,542 A | 7/1941 | Anderson | |
| 3,912,004 A | 10/1975 | Darm | |
| 4,174,987 A | 11/1979 | Belvin et al. | |
| 4,293,027 A | 10/1981 | Tepe et al. | |
| 4,461,344 A | 7/1984 | Allen et al. | |
| 4,616,695 A | 10/1986 | Takahashi et al. | |
| 4,653,574 A * | 3/1987 | Quinlisk et al. | 165/54 |
| 4,820,468 A | 4/1989 | Hartig | |
| 4,841,738 A | 6/1989 | Katsuki et al. | |
| 4,858,685 A | 8/1989 | Szucs et al. | |
| 5,024,263 A | 6/1991 | Laine et al. | |
| 5,078,208 A | 1/1992 | Urch | |
| 5,123,595 A | 6/1992 | Doss | |
| 5,193,610 A | 3/1993 | Morissette et al. | |
| 5,195,240 A | 3/1993 | Shuster et al. | |
| 5,239,834 A | 8/1993 | Travers | |
| 5,259,203 A | 11/1993 | Engel et al. | |
| 5,348,077 A | 9/1994 | Hillman | |
| 5,431,215 A | 7/1995 | Davis | |
| 5,474,639 A | 12/1995 | Ålander et al. | |

(Continued)

FOREIGN PATENT DOCUMENTS

DE 2325261 5/1974

(Continued)

OTHER PUBLICATIONS

Official Action dated Jul. 2, 2008 for the PCT application PCT/US 2008/000863.

(Continued)

Primary Examiner — Frantz Jules
Assistant Examiner — Travis Ruby
(74) Attorney, Agent, or Firm — Gregor N. Neff

(57) ABSTRACT

Condensate accumulating in the incoming outside air flow passages of a heat exchanger is fed back into the exhaust flow passages of the heat exchanger to provide improved heat transfer in the heat exchanger, and to avoid the necessity for drainage of the condensate from the heat exchanger. The heat exchanger includes a plastic multi-tube panel core and a solid plastic housing, with opposed-flow heat exchange and inlet-outlet extensions from only one side of the core.

9 Claims, 3 Drawing Sheets

U.S. PATENT DOCUMENTS

| | | | |
|---|---|---|---|
| 5,497,823 A | 3/1996 | Davis | |
| 5,927,387 A | 7/1999 | Nyström | |
| 6,289,974 B1 | 9/2001 | DeGregoria et al. | |
| 2001/0032714 A1* | 10/2001 | Haglid | 165/54 |
| 2002/0164944 A1* | 11/2002 | Haglid | 454/228 |

FOREIGN PATENT DOCUMENTS

| | | |
|---|---|---|
| DE | 3030778 | 2/1982 |
| DE | 3128684 | 2/1983 |
| EP | 0184887 | 6/1986 |
| GB | 272926 | 3/1928 |
| GB | 1354502 | 5/1974 |
| JP | 0080644 | 7/1981 |
| JP | 0055338 | 4/1982 |
| JP | 57-1731 | 6/1989 |
| JP | 1-318821 | 12/1989 |
| JP | 3271696 | 12/1991 |
| JP | 4-313693 | 11/1992 |
| JP | 58043398 | 3/1993 |
| JP | 05157480 | 6/1993 |
| JP | 10047884 | 2/1998 |
| SU | 1083033 | 3/1984 |
| WO | WO 89/05433 | 6/1989 |

OTHER PUBLICATIONS

Yoshino, M. et al.—"The Lossnay Penetration Type total Heat Exchanger"—Mitsubishi Electric Engineer Japan—No. 38—Dec. 1973, pp. 24-27.

* cited by examiner

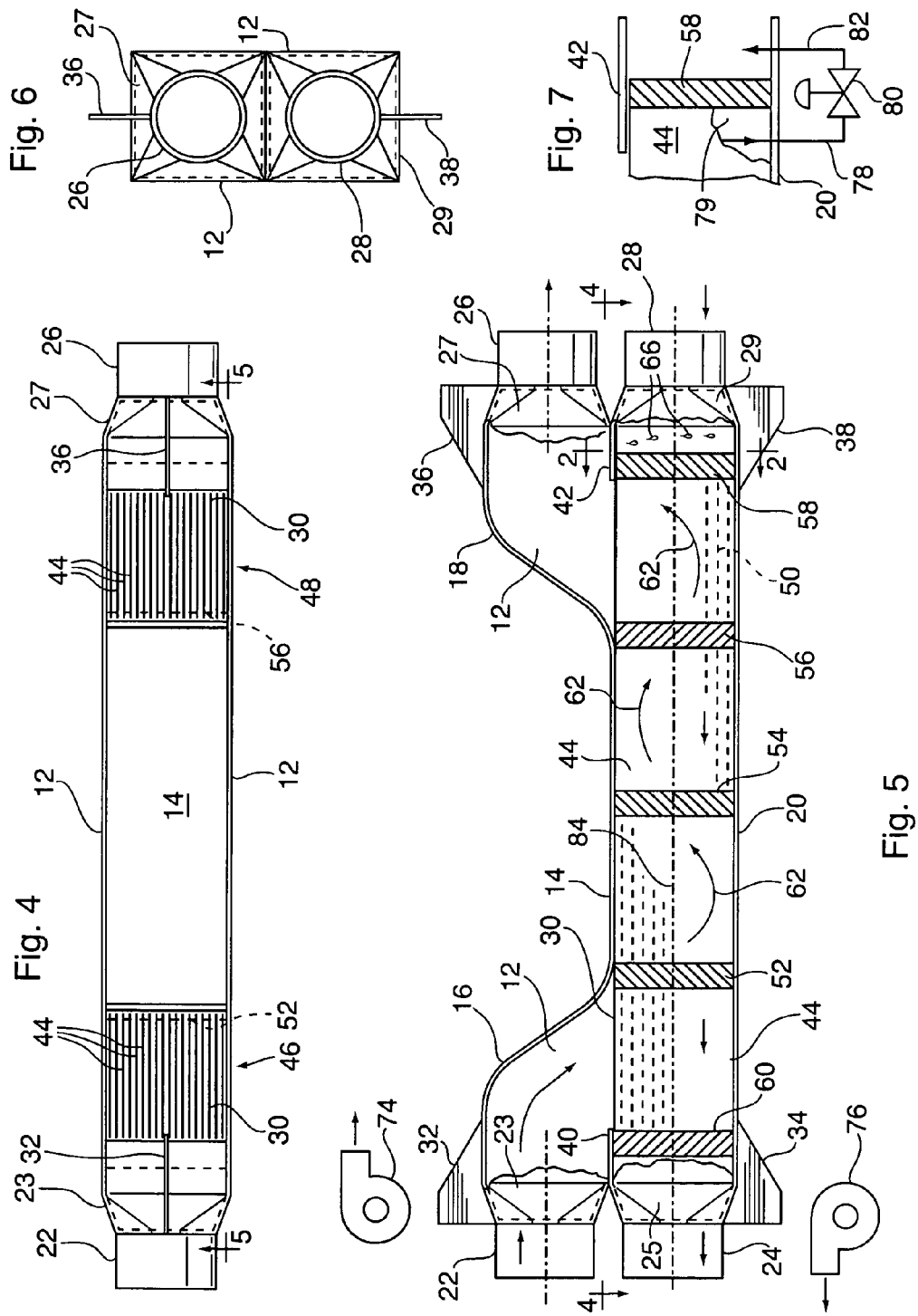

ENERGY RECOVERY VENTILATOR WITH CONDENSATE FEEDBACK

This invention relates to energy recovery ventilation, and particularly to heat exchanger structures and methods for use in such ventilation.

U.S. Pat. No. 6,983,788 shows a particularly beneficial energy recovery device and method for energy recovery ventilation and for manufacturing heat exchangers and ventilation systems for such purpose.

It is an object of this invention to provide improvements for such ventilation and heat exchanger systems and methods.

In particular, it is an object to provide such a ventilation system, heat exchanger and method in which the effectiveness, and particularly the latent effectiveness, is significantly improved.

Another object of the invention is to provide a heat exchanger structure which is particularly easy to install, robust and long-lasting.

A further object is to provide such a system, method and heat exchanger which can perform well in even the most demanding hot and humid climactic conditions.

A further object is to provide a relatively simple structure which is relatively less costly to manufacture.

In accordance with the present invention, the foregoing objects are met by the provision of an energy recovery heat exchanger in which the condensate that often forms in the incoming outside air flow passages is delivered to the exhaust flow passages of the heat exchanger, preferably at the inlet ends of those passages. This is believed to significantly increase the latent effectiveness of the heat exchanger. It is believed that this is because the condensate evaporates in the exhaust air and performs evaporative cooling to extract more water from the incoming air.

This has multiple benefits. First, more water is removed from the incoming air, thus requiring considerably less energy use in the refrigeration systems which may be used to remove further water content from the incoming air and create a comfortable level of humidity in the building.

Secondly, because the condensate is evaporated and/or caught up in the exhaust air stream, there need not be a drain connection to the ventilator to drain the liquid condensate off. This saves considerably in manufacturing cost, installation time and expense, and in reducing a possible source of maintenance problems.

The objects of the invention also are satisfied by the provision of a plastic housing which forms four inlet/outlet fittings, all aligned parallel to one another so as to facilitate connecting ductwork to the heat exchanger unit. Furthermore, two extensions from the sides of the housing, at opposite ends of the housing, are provided for the inlet and outlet of either the exhaust or outside air paths. This reduces material and manufacturing costs when the outside housing for the heat exchanger is formed primarily of plastic plates welded together and to the core of the heat exchanger.

This feature also has the advantage of permitting the inlet and outlet for the incoming air to be located vertically above the inlets and outlets for the exhaust air, so that the feed of condensate from the outside air conduits to the exhaust conduits is aided by gravity.

Preferably, a positive-pressure air mover is used to push air through the outside air flow passages, and a negative pressure air mover is used to pull the exhaust air through the heat exchanger. This makes isolation of the air flows more secure, in that, if there are any leaks between the outside air and exhaust flow passages, the flow always will be from the outside air into the exhaust air so that there is no contamination of the incoming air.

This positive pressure feature is used for a beneficial purpose in one embodiment of the invention, in which a restricted leakage path is provided near the outlet end of the outside air passages at a location where condensate will be forced through the path into the inlet ends of the exhaust flow passages so as to simply and automatically provide for condensate feedback to promote enhanced performance.

If desired, the feedback of condensate can be stopped and started or otherwise modulated by means of a control knob which turns a rod which rotates into a position to fully or partially close the openings at the leak location.

Alternatively, a pump can be used to selectively pump the condensate from a collection point in the outside air flow passages to the inlets of the exhaust air passages so as to provide full control of the function. Thus, the function can be turned off completely, turned on completely, or operated at intermediate levels between those two.

As another alternative, a solenoid valve can be connected between a condensate collection point and the inlets to the exhaust flow passages to either allow the positive air pressure to feed the condensate, or to stop such flow.

The foregoing and other objects and advantages will be set forth in or apparent from the following description and drawings.

IN THE DRAWINGS

FIG. 4 is a top plan cross-sectional view taken along line 4-4 of FIG. 5;

FIG. 5 is a partly cross-sectional, side elevation view of the heat exchanger, taken along line 5-5 of FIG. 4;

FIG. 6 is a right end elevation view of the heat exchanger shown in FIGS. 1, 4 and 5; and FIG. 7 is a schematic view of alternative embodiments of the invention.

GENERAL DESCRIPTION

Figure 1:
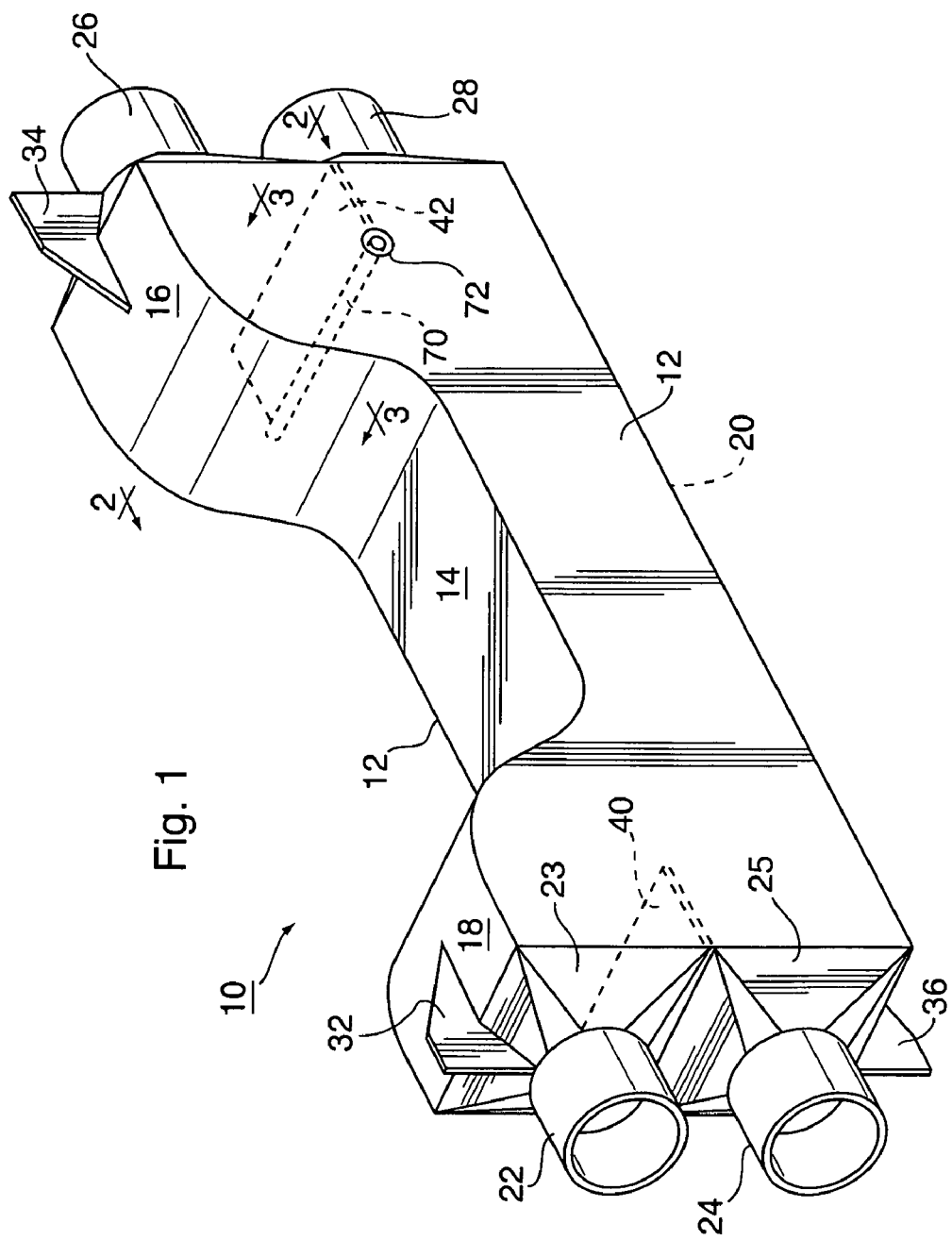
FIG. 1 is a perspective view of a preferred embodiment of a heat exchanger constructed in accordance with the present invention.

FIG. 1 shows a heat exchanger 10 constructed in accordance with the present invention.

The heat exchanger has a housing made of solid plastic material and having two vertical opposed side walls 12, a bottom wall 20, and a top wall 14 with integral raised curved end portions 16 and 18.

Four inlet or outlet fittings 22, 24, 26, and 28 are formed and welded to the walls of the heat exchanger by the use of transition pieces 23, 25, 27, and 29 (also see FIGS. 4 and 5). Advantageously, the longitudinal axis of each of the fittings is parallel to that of the other fittings and to the longitudinal axis of the heat exchanger.

Referring now to FIGS. 4 and 5, inside the housing is a heat exchanger core structure 30, which is a simple elongated rectangular parallelpiped with a square cross-section. Its construction will be described in greater detail below.

Secured to the ends and extending upwardly and downwardly from the outside of the housing are extensions 32, 34, 36, and 38 which can be used advantageously to mount the heat exchanger in, on top of or outside of a building.

As it is shown best in FIG. 5, plates 40 and 42 extend backwardly from the junction of the transition pieces 23 and 25 or 27 and 29, and are welded or otherwise secured between the side walls 12 to separate the flow paths of the outside air entering the building and the exhaust air leaving the building.

Core Structure

Referring now primarily to FIGS. 4 and 5, the core 30 is made up of a plurality of elongated rectangular panels 44 made of plastic material and having integral parallel tubes secured side-by-side to one another. This material is sometimes known as "signboard" material and is described in greater detail in my above-identified patent.

Referring to FIG. 5, the panels 44 are spaced apart from one another by means of spacers 52, 54, 56, 58, and 60 which are welded or otherwise secured between adjacent panels to form air spaces between the panels.

Preferably, the spacers are fairly widely spaced from one another and are formed from strips of the same signboard material as that used for the panels 44. The two end spacers 58 and 60 are aligned with their internal tubular passages extending in the vertical direction, perpendicular to the longitudinal axis 84 of the core. Thus, the end spacers 58 and 60 block the flow of air in a direction parallel to the longitudinal axis.

The remaining spacers 52, 54, and 56 have their internal tubes extending at an angle of approximately 45° to the longitudinal axis 84, with the angle alternating between downwardly and upwardly plus 45° and minus 45° to alternatingly direct the flow of air, as shown in FIG. 5. By this means, air flowing in the spaces between the panels 44 will be directed in a serpentine path indicated by the arrows 62 to effectively lengthen the path and increase the dwell time and turbulence of the air flowing in the spaces so as to increase heat transfer between the air flowing in the spaces and that flowing in the panels 44.

Referring now to FIG. 4 as well as FIG. 5, the upper surface 14 of the housing in the center of the core, and the bottom and side panels 20 and 12 are secured as by welding, adhesive bonding, or other means to the outside of the core. This eliminates "dead" air spaces between the housing and the core.

The housing at 16 and 18 extends outwardly from the core leaving open spaces 46 and 48 (FIG. 4) which provide inlet and outlet openings for the spaces between adjacent panels. Preferably, as already described above, this structure forms inlet and outlet fittings 22 and 26 for conducting outside air into the building.

Air Movers

Referring again to FIG. 5, two air movers or fans 74 and 76 are provided for moving air through the heat exchanger.

The air mover 74 preferably is mounted upstream of the inlet 46 for the outside air, so as to produce a positive pressure in the outside air ducts.

Preferably, the air mover 76 is connected downstream from the outlet of the exhaust passages and produces a negative pressure in the exhaust passages. This has the benefit of insuring that any leakage between the outside air and exhaust passages will result in flow from the outside air into the exhaust air, thus avoiding contamination of the incoming air by the outgoing air.

Condensate Feedback

In accordance with one of the principal features of the invention, means are provided for collecting condensate from incoming outside air and feeding it back into the exhaust air and, ultimately, back into the outside air. This has at least two significant advantages.

First, it appears to significantly improve the effectiveness, and particularly the latent effectiveness, of the heat exchanger. This is believed to be because the condensate which is fed back into the exhaust air causes evaporative cooling of the exhaust air and, therefore, additional cooling of the incoming outside air and additional removal of moisture from that outside air.

Secondly, this feature avoids the need for a drain connection which usually is required to drain off the accumulated condensate. This saves considerably in manufacturing cost for the heat exchanger, and in the installation time and cost. It is believed that it also reduces potential maintenance costs for the drain system.

Figure 2:
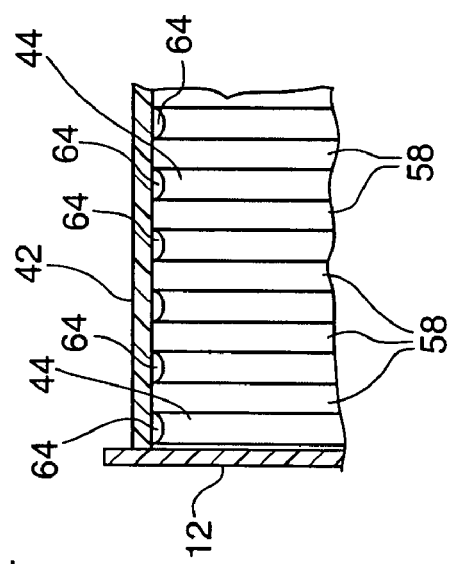
FIG. 2 is a cross-sectional view, taken along line 2-2 of FIGS. 1 and 5, showing the condensate feedback feature of the invention.
Figure 3:
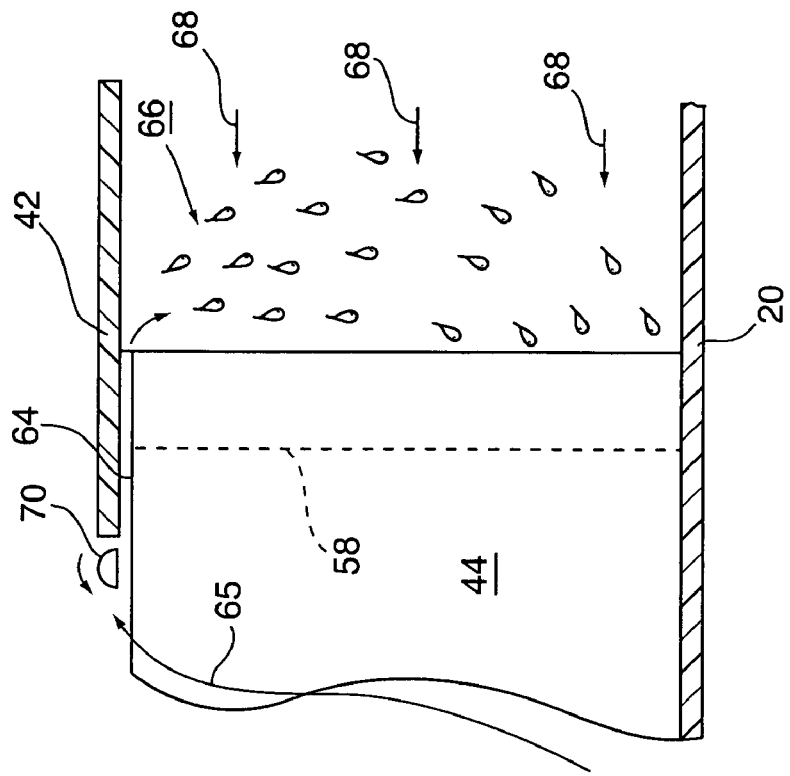
FIG. 3 is a side elevation view, partially cross-sectional and partially schematic, taken along line 3-3 of FIG. 1, illustrating the operation of the condensate feedback feature of the invention.

One method which is used for implementing condensate feedback is illustrated principally in FIGS. 2 and 3.

FIG. 2 is a cross-sectional, broken away view of the plate 42 at the right end of the heat exchanger.

The plate 42 is welded between the side walls 12 and either comes close to or rests upon the upper edges of the spacers 58 and the panels 44 of the core 30.

The cutting of the upper edges of the panels 44 tends to leave recesses 64 along the upper edges of the panels. Unless these recesses are sealed, the structure shown in FIGS. 2 and 3 provides multiple leakage paths for a small amount of air to pass from the downstream ends of the outside air conduits to the inlet ends of the exhaust passages.

The liquid condensate is believed to be forced by the positive air pressure in the outside air ducts to move relatively rapidly through the passageways 64 and form droplets 66 (FIG. 3) which then are forced into the exhaust passages in the panels 44 by the movement of the exhaust air in the direction indicated by arrows 68 in FIG. 3. The condensate then is fully or partially evaporated and issues from the outlet end of the exhaust tubes in the form of water vapor and/or droplets.

Modulating Condensate Flow

The flow of condensate can be controlled in any of several different ways.

First, the spacing between the upper edges of the panels 44 and the plate 42 can be varied to either increase or decrease the air and liquid flow.

It is believed that the air leakage usually will be less than one percent of total outside air flow. This does not significantly reduce the outside air entering the building.

Alternatively, referring to FIG. 1, an elongated half-round rod 70 rotatably mounted in opposite sides 12 of the housing and provided with a knob 72 on the outside of the housing is mounted near the left edge of the plate 42, as it is shown in FIG. 3. The rod 70 is coated with a thick resilient coating (e.g., silicone rubber) which, when the rod 70 is turned, deforms and engages the upper edges of the panels 44 and fills the channels 64 to close the leakage paths and prevent condensate flow. This might be done, for example, in order to insure a higher moisture content for incoming air, when this is needed or desired.

It should be understood that the rod 70 can be rotated to intermediate positions between fully open and fully closed so as to correspondingly modulate the flow through the leakage paths.

A further modulation method is illustrated schematically in FIG. 7. Condensate is collected in an open area 79 at the bottom right hand corner of the panels 44 as shown. The plate 42 is tightly sealed at the top edges of the panels 44 to prevent leakage.

Reference numeral 80 indicates an electrically operated pump or a solenoid-operated valve. When the valve is opened, condensate flows through the line 78 from the collection area 79 and is delivered to the input ends of the panels 44, under the positive pressure provided by the air mover 74 and the negative pressure from the air mover 76.

In the situation where that pressure might not be sufficient, or for the most precise control, a pump 80 can be turned on to pump the condensate. The pump can have a variable flow rate. Both the valve and the pump have the advantage that they can be remotely activated.

A particular advantage of the heat exchanger 10 is that very little or no de-icing is required for the heat exchanger during cold weather. This is believed to be, in part, because relatively high flow velocities can be used in exhausting the exhaust air during both summer and winter, without significantly reducing the energy-recovering heat transfer between the incoming and outgoing air.

Alternatives

Although the heat exchanger construction described above is highly advantageous for use in performing condensate feedback, it should be understood that the invention can be used with many other types of heat exchangers. For example, condensate feedback also can be used with ordinary metal or plastic-tube cubes used as heat exchangers, where the flow passages are mostly perpendicular to one another, as shown in U.S. Pat. No. 6,176,305.

Although the housing shown is formed of solid plastic panels welded together and to the outside surfaces of the core, the housing also can be formed by melting the external edges of the core, as described in the above-identified U.S. Pat. No. 6,983,788.

it also should be understood that the flow passages designated for carrying outside air or exhaust air can be changed to carry the other type of air, if needed or desired.

The above description of the invention is intended to be illustrative and not limiting. Various changes or modifications in the embodiments described may occur to those skilled in the art. These can be made without departing from the spirit or scope of the invention.

What is claimed is:

1. An energy recovery ventilating device comprising a heat exchanger having plural outside air intake flow conduits interleaved with plural exhaust air flow conduits,
   each of said outside air intake and exhaust air flow conduits having an inlet end and an outlet end,
   at least one liquid flow conduit formed between said outside air intake flow conduits and adjacent said inlet ends of said exhaust air conduits for conducting into said exhaust air conduits liquid condensed from the outside air flowing through said outside air intake conduits to feed back liquid from said outside air conduits to said exhaust air flow conduits.

2. The device of claim 1 in which said outlet ends of said outside air intake flow conduits are located above said inlet ends of said exhaust flow conduits and said liquid flow conduit conducts said condensed liquid to
   adjacent said inlet ends of said exhaust conduits to induce gravity flow of said liquid into said exhaust air flow conduits.

3. The device of claim 1 including a modulating device for selectively modulating the flow of said liquid to said exhaust conduits, said modulating device being selected from the group consisting of
   a device for selectively blocking said liquid flow conduit, a motor driven pump, and a valve.

4. The device of claim 1 including a positive pressure air mover connected to said outside air intake flow conduits to push outside air therethrough, and
   a negative pressure air mover for pulling exhaust air from a building through said exhaust conduits, and restricted passageways between said intake and exhaust conduits for allowing condensate to flow from said intake conduits to said exhaust conduits.

5. An energy recovery ventilating device comprising a heat exchanger having plural outside air intake flow conduits interleaved with plural exhaust air flow conduits, and
   at least one liquid flow conduit for conducting liquid condensed from the outside air flowing through said outside air intake conduits into said exhaust air conduits,
   in which said air intake and exhaust air flow conduits are elongated and conduct fluid in opposite directions for at least a portion of their lengths,
   a heat exchanger core being comprised of parallel plastic panels with multiple tubes forming said exhaust flow conduits,
   spacers secured between adjacent panels to form spaces comprising said outside air intake flow conduits between said panels,
   intake air fittings at opposite ends of said core and communicating with said spacers,
   exhaust air fittings communicating at opposite ends of said core with said tubes, and
   a housing secured to and enclosing said core and forming said fittings.

6. An energy recovery ventilating device comprising a heat exchanger having plural outside air intake flow conduits interleaved with plural exhaust air flow conduits, and
   at least one liquid flow conduit for conducting liquid condensed from the outside air flowing through said outside air intake conduits into said exhaust air conduits,
   a housing for said plural outside air intake flow conduits and said plural exhaust air flow conduits,
   said housing forming an outside air inlet duct and an outside air outlet duct, and an exhaust air inlet duct and an exhaust air outlet duct, said outside air outlet duct being, located above said exhaust air inlet duct and forming said at least one liquid flow conduit for draining liquid condensate from said outside air into said exhaust air conduits adjacent said exhaust air inlet duct under the force of gravity.

7. The device of claim 6 in which each of said housing and said conduits therein is elongated, said housing having a mid-section between said inlet and said outlet ends, said midsection of said housing forming said outside air intake conduits and said exhaust air conduits into substantially opposite counterflow conduit sections for the exchange of heat therebetween.

8. The device of claim 7 in which said outside air intake flow conduits and said exhaust air flow conduits are formed from panels of plastic tubes, said panels being secured together to form a heat exchange core, said core having elongated recesses in the upper surface of said core, a separate plate covering the tops of the downstream ends of the panels forming said outside air intake conduits and separating the outside air flow from the exhaust airflow, said recesses collecting condensate from said outside air and forming plural ones of said liquid flow conduits.

9. The device of claim 8 in which said housing forms a space at the inlet to said exhaust air conduits and said recesses empty into said space so that water from said recesses is carried into exhaust air flowing into said exhaust air conduits.

* * * * *